US008843628B2

(12) United States Patent  
Sticker

(10) Patent No.: US 8,843,628 B2  
(45) Date of Patent: Sep. 23, 2014

(54) SYSTEM AND METHOD OF CAPACITY MANAGEMENT FOR PROVISIONING AND MANAGING NETWORK ACCESS AND CONNECTIVITY

(75) Inventor: Harry Sticker, New York, NY (US)

(73) Assignee: Harris Corporation, Melbourne, FL (US)

(*) Notice: Subject to any disclaimer, the term of this patent is extended or adjusted under 35 U.S.C. 154(b) by 393 days.

(21) Appl. No.: 12/873,005

(22) Filed: Aug. 31, 2010

(65) Prior Publication Data

US 2012/0054343 A1  Mar. 1, 2012

(51) Int. Cl.  
*G06F 15/16* (2006.01)  
*G06F 3/00* (2006.01)  
*H04L 12/24* (2006.01)  
*H04L 12/26* (2006.01)

(52) U.S. Cl.  
CPC ........ *H04L 43/0805* (2013.01); *H04L 41/0896* (2013.01); *H04L 41/22* (2013.01)

USPC ............................ 709/225; 709/220; 715/738

(58) Field of Classification Search  
USPC ............................ 715/736–790; 709/220–225  
See application file for complete search history.

(56) References Cited

U.S. PATENT DOCUMENTS

| | | | | |
|---|---|---|---|---|
| 5,680,325 | A * | 10/1997 | Rohner | 709/220 |
| 2007/0283286 | A1 * | 12/2007 | Ashok et al. | 715/764 |
| 2008/0049614 | A1 * | 2/2008 | Briscoe et al. | 370/230 |
| 2010/0142408 | A1 * | 6/2010 | Hajiaghayi | 370/255 |
| 2010/0322390 | A1 * | 12/2010 | Bialk et al. | 379/32.04 |

\* cited by examiner

*Primary Examiner* — Yasin Barqadle  
(74) *Attorney, Agent, or Firm* — Allen, Dyer, Doppelt, Milbrath & Gilchrist, P.A.

(57) ABSTRACT

A system and method is provided for capacity management of network connectivity between endpoints coupled to one another via a circuit. An inventory of network elements may be maintained in a database. A circuit designer may be presented with network elements that may be selected when designing the circuit between endpoints.

5 Claims, 5 Drawing Sheets ary errors, fictitious names (i.e., made-up
names), and/or other data integrity errors.

SYSTEM AND METHOD OF CAPACITY MANAGEMENT FOR PROVISIONING AND MANAGING NETWORK ACCESS AND CONNECTIVITY

TECHNICAL FIELD

The disclosure relates generally to the field of carrier network connectivity management and more particularly to capacity management of network elements and facilities providing carrier-neutral network access connectivity.

BACKGROUND

A core network access provisioning platform (also referred to herein as "Core180 platform") provides secure and dedicated long haul transport over the platform's private backbone network. The Core180 platform acts as a neutral gateway and virtual point of presence into significantly more providers than those that would be otherwise available to a customer. The Core180 platform intersects hundreds of carrier networks and enables additional control including, but not limited to, location, speed, and value. The Core180 platform can deliver local connectivity to any endpoint in North America.

The Core180 platform may provide an ability to design a circuit that couples at least one endpoint to at least one other endpoint based on customer requests for network connectivity between the endpoints. For example, a computer server in Rhode Island may be coupled to a computer server in Florida using a circuit designed/provided by the Core180 platform. The circuit may include one or more segments coupled to one another to form the circuit. In order to provide the customer with a circuit that has the best price/performance value, segments from many suppliers may be selected and integrated at unique integration points in the platform's backbone network in addition to segments provided by the Core180 platform itself. In other words, selection of segments from the backbone network itself and/or one or more suppliers may be based on which set of segments for the circuit provide the best price/performance value for the customer request. When the circuit includes a segment from one or more suppliers other than the backbone network, the segment from the one or more suppliers may be coupled to the backbone network at an interconnect point. In other words, the interconnect point may couple the backbone network with an outside or third party vendor of network services. Thus, the circuit may include all or a portion of the backbone network provided by the Core180 platform and/or all or a portion of outside vendor networks.

Each segment may terminate at one or more equipment (which may be part of Core180 platform, i.e., the private backbone network). Each equipment may include channels/ports being used to couple the segment. Without information related to network capacity, a user may be unable to design an appropriate circuit. For example, without a real-time inventory of available equipment, the user may attempt to add a segment that includes equipment that is unavailable. Equipment may be unavailable because, for example, it is already in use by another circuit, is undergoing maintenance or other down-time, and/or is otherwise not available for use. Additionally, without an inventory of channels of existing circuits that may be available for use, optimal use of circuits/facilities may be difficult to achieve.

Furthermore, the user may manually enter the ports/channel/equipment being used in the designed circuit without any constraints, which may present problems such as, among others, data entry errors, fictitious names (i.e., made-up names), and/or other data integrity errors.

SUMMARY

In some implementations of the invention, the disclosure relates to a system and method for capacity management of network connectivity between endpoints coupled to one another via a circuit. In some implementations of the invention, network capacity information may be maintained in a database. In some implementations of the invention, a circuit designer may be presented with network elements that may be selected when designing a circuit between endpoints. In some implementations of the invention, when a network element is selected, the capacity information may be updated to indicate the use of the network element so that the inventory of what is available, among other information, may be maintained.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
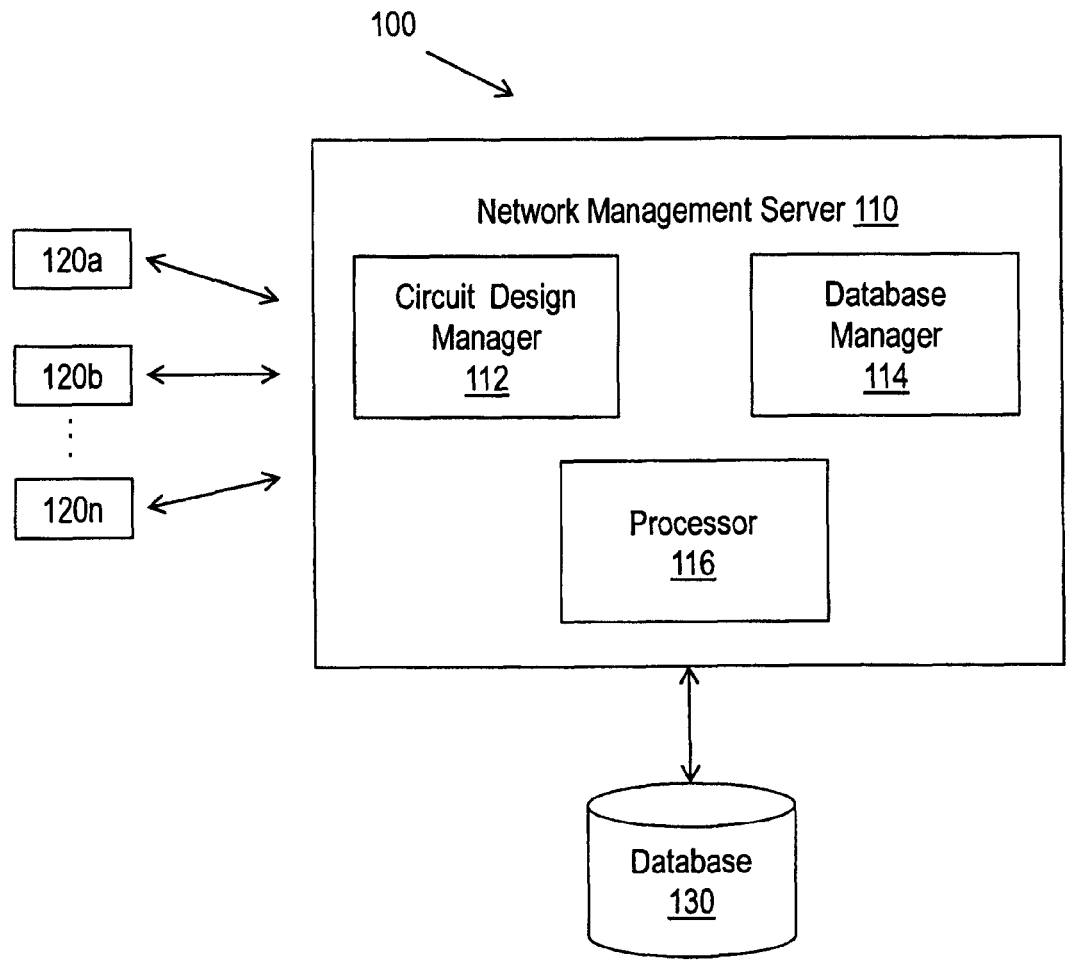
FIG. 1 illustrates an exemplary network management system, according to various aspects of the invention.

FIG. 1 is an exemplary illustration of a network management system 100, according to an aspect of the invention. Network management system 100 may include, among other things, a network management server 110 that is configured to manage network connectivity between endpoints such as, for example, a first endpoint and a second endpoint. Network management server 110 may manage network circuit design from the first endpoint to the second endpoint based on customer requests for network connectivity between the endpoints. A designed circuit may connect the first endpoint to the second endpoint, and may include one or more segments that are coupled to one another to form the designed circuit. As would be appreciated, the first and second endpoints described herein are non-limiting examples only; any type and number of endpoints may be utilized based on customer requests.

Network management server 110 may include a processor 116, circuitry and/or other hardware configured to execute computer-readable instructions. According to one aspect of the invention, network management system 100 may include one or more tangible computer-readable storage media configured to store one or more software modules, wherein the software modules include computer-readable instructions that when executed by the processor cause the processor to perform the functions described herein. According to one implementation, network management server 110 may comprise computer hardware programmed with a computer application having one or more software modules that enable the various features and functions of the invention. Non-limiting examples of the software modules in the application may include one or more of a circuit design manager 112, a database manager 114, and/or other modules for performing the features and functions described herein.

Users may interact with network management server 110 via one or more client devices 120a, 120b, . . . , 120n. Client devices 120a, 120b, . . . , 120n may each comprise or otherwise access a user interface, such as an Application Programming Interface (API) or a Graphical User Interface (GUI). In some implementations of the invention, the user may include a computer program, a person, or other entity. Through the user interface, the user may perform various operations that may facilitate interaction with network management server 110. For example, the user may, via the user interface, provide customer requests for network connectivity (i.e., establishing a network connection between endpoints), design one or more circuits, view/update/manage circuits, request one or more reports, and/or perform other operations. Client devices 120a, 120b, . . . , 120n may include a processor (not otherwise illustrated in FIG. 1), circuitry, and/or other hardware operable to execute computer-readable instructions.

According to one implementation, circuit design manager 112 may manage circuit design between endpoints. In some implementations of the invention, circuit design manager 112 may receive a customer request to establish a network connection between a first endpoint and a second endpoint. In other words, a request associated with designing a circuit between endpoints may be received. The customer request may include/define one or more parameters for the network connection. In some implementations of the invention, the one or more parameters may include, for example, network speed, bandwidth, price, and/or other parameters.

In some implementations of the invention, a circuit designer may design a circuit by selecting one or more segments (from the private backbone network, from external network carriers/providers, or both) based on the customer request (i.e., one or more parameters of the customer request). In this manner, the circuit designer may that may provide a best price/performance value for the customer based on the one or more parameters of the customer request. In some implementations of the invention, the circuit designer is a person such as an a technician, a computing device configured to design a circuit based on the one or more parameters, and/or other user or entity that may design the circuit. In some implementations, circuit design manager 112 may provide the circuit designer with various segments from which to specify (i.e., select) to design the circuit via the user interface. In some implementations of the invention, circuit design manager 112 may generate a GUI to be presented to the circuit designer.

In some implementations of the invention, a segment may terminate at one or more network elements. Thus, in some implementations of the invention, a segment may be associated with or otherwise be defined by the one or more network elements. In some implementations of the invention, the one or more network elements may include but not be limited to, one or more equipment associated with the private backbone network and/or external network providers; a rack, a shelf, or a chassis associated with the equipment; a slot, a card, and/or a panel; a channel or a port associated with the equipment, and/or other elements that may be used to couple a first endpoint with a second endpoint.

In some implementations of the invention, each chassis may have a slot for which a card may be inserted. Cards may have ports with copper wiring. Each card may be prewired to a particular panel (for example, card A may be prewired to panel A). Circuits may be wired to panels. Each equipment may include channels/ports being used to couple the segment. In one implementation, circuits may be designed by choosing equipment and/or choosing channels/ports associated with the equipment.

In some implementations of the invention, a segment may include one or more first network elements at one end of the segment and one or more second network elements at the other end of the segment. In some implementations of the invention, the one or more network elements may couple a first segment with a second segment. In some implementations of the invention, the one or more network elements may be part of the private backbone network, part of one or more external network providers, and/or part of another network. In these implementations, when a segment is selected, one or more network elements associated with or otherwise defining at least one end of the segment may be selected. In other words, specification/selection of a segment may include specification/selection of one or more network elements associated with the segment.

In some implementations of the invention, network management system 100 may store, track, or otherwise maintain capacity information that may indicate an inventory, availability, and/or other information related to the one or more network elements.

Because the one or more network elements may include various equipment, components of equipment, and/or other elements, a real-time model of network element capacity at multiple (even fine-grained) levels of network elements may be generated. In this manner, efficient coupling of a first endpoint with a second endpoint may be achieved using the real-time model. For example, a segment may be designed based on the capacity information so that only segments (i.e., the associated network elements) that are available may be included to form a circuit.

In some implementations of the invention, the capacity information may include capacity information for interconnect points described herein. Thus, in these implementations, capacity information may be available for network elements that couple the backbone network to one or more other networks. In this manner, a real-time model of capacity of networks may be generated.

In some implementations of the invention, database 130 may store the capacity information. In some implementations of the invention database 130 may include capacity information for network elements associated with the private backbone network. In some implementations of the invention, database 130 may include capacity information associated with external network providers and/or other network providers.

In some implementations of the invention, database manager 114/network management server 110 may be communicatively coupled to database 130. In these implementations, circuit design manager 112 may communicate with database manager 114 to retrieve the capacity information.

In some implementations of the invention, the capacity information may be updated. Updates to the capacity information may include, for example, adding new network elements, deleting existing network elements, updating a status of network elements, and/or other updates associated with network elements. As would be appreciated, the capacity information may be updated in substantially real-time, periodically (at intervals), by request, and/or at other times. For example, when a circuit designer selects a network element for a segment during circuit design, database 130 may be updated to indicate use of the network element so that an inventory of what is available is maintained. In other words, when a network element has been selected for a particular segment/circuit, an availability status of the network element may be updated to designate the network element is unavailable. The designations may include, but not be limited to, "used", "not available," and/or other designation that indicates the selected network element is unavailable for use in another circuit.

Similarly, when one or more network elements is no longer being used, the capacity information may be updated to indicate availability of the one or more network elements. For example, network management server 110 may receive an indication that a segment (and/or one or more of its corresponding network elements) is no longer being used. In this example, database 130 may be updated to designate that the segment and/or associated network elements are now available. By updating the capacity information to include availability designations, an updated model of network capacity may be achieved so that actual availability of the network elements may be ascertained.

In some implementations of the invention, network management server 110 may access the capacity information in order to filter network elements. In other words, network management server 110 may determine an inventory and/or availability of network elements so that only inventoried network elements within the one or more network elements (as opposed to network elements with made-up names, for example) and/or available network elements (such as network elements that are online and/or otherwise available for use) may be selected when designing a particular circuit. In this manner, when a circuit is being designed, the capacity information may be used to guide which network elements may be included in or otherwise be used to form the circuit.

In some implementations of the invention, circuit design manager 112 may receive a request associated with designing a circuit. For example, in order to fulfill a customer request to connect one endpoint with another endpoint, a circuit designer may wish to design a circuit that connects the endpoints. Accordingly, the circuit designer may make the request. The request may be made through a GUI, an API, and/or other interface.

In some implementations of the invention, in response to the request, circuit design manager 112 may access capacity information associated with each of the network elements. In some implementations of the invention, circuit design manager 112 may access the capacity information by communicating with database manager 114. For example, circuit design manager 112 may query or otherwise interrogate database 130 via database manager 114, which may communicate with database 130 to retrieve the capacity information. Database manager 114 may provide the retrieved capacity information to circuit design manager 112.

In some implementations of the invention, circuit design manager 112 may determine an availability of each network element based on the capacity information. In other words, because the capacity information may include whether or not a network element is available, circuit design manager 112 may determine whether a particular network element is available for use in a circuit.

In some implementations of the invention, circuit design manager 112 may filter the network elements based on the determined availability of each of the network elements. In other words, circuit design manager 112 may allow only the available network elements to be selectable. In some implementations of the invention, circuit design manager 112 may communicate the filtered network elements for selection.

In some implementations of the invention, circuit design manager 112 may filter the network elements by omitting the network elements that are unavailable from the network elements. In other words, circuit design manager 112 may communicate only network elements that are available while omitting network elements that are unavailable so that they may not be selected by the circuit designer. In some implementations of the invention, circuit design manager 112 may filter the plurality of network elements by providing indicia for the unavailable ones of the plurality of network elements, wherein the indicia indicates the unavailable ones of the plurality of network elements are not selectable. In these implementations, circuit design manager 112 may communicate the unavailable ones of the plurality of network elements and the indicia. For example, when presented via a GUI, the unavailable ones of the plurality of network elements may be presented to the circuit designer with indicia (such as being "grayed out" or other indicia) that indicates the network elements are not selectable.

As would be appreciated, circuit design manager 112 may access the capacity information, determine the availability, and/or filter the network elements based on an interaction with database 130. For example, the interaction may include a database query that accesses the capacity information, determines which network elements are available, and filters network elements based on the capacity information stored by database 130.

In some implementations of the invention, circuit design manager 112 may communicate the filtered plurality of network elements for selection. For example, the filtered plurality of network elements may be communicated to a circuit designer for selection by the circuit designer. In one implementation, circuit design manager 112 may communicate the retrieved information via a GUI presented to the circuit designer. The GUI may present the one or more the available network elements (i.e., the filtered plurality of network elements) for selection by the circuit designer.

In one implementation, circuit design manager 112 may receive an indication that at least one of the available network elements is selected by the circuit designer or is otherwise unavailable for use in a circuit (such as when a network element is undergoing an outage or other downtime). Circuit design manager 112 may communicate the indication to database manager 114. Database manager 114 may store the indication in database 130. Database manager 114 may designate the selected network element as unavailable and may store the unavailable designation in the database. As such, for any subsequent requests to establish a network connection between endpoints and/or to view available network elements, the network element(s) marked as unavailable may not be presented to or otherwise may not be selectable by the circuit designer. In some implementations of the invention, even though the network element(s) that are designated unavailable may be presented to the circuit designer, they may be disabled (e.g., grayed out) to indicate that they are not available or otherwise not selectable by the circuit designer.

In some implementations of the invention, circuit design manager 112 may receive an indication that a previously unavailable network element is currently available. For example, a circuit designer may indicate that a circuit and its corresponding segments/network elements are no longer in use. In another example, a system administrator may indicate that a previously down network element has been repaired and is now available for use. In some implementations of the invention, circuit design manager 112 may cause the capacity information to be updated to indicate the availability.

In some implementations of the invention, database-level constraints may define the network elements (e.g., ports, channels, equipment, etc.). In other words, database 130, for example, may include a listing of network elements such that only network elements having one or more records in database 130 is included in the capacity model. In this manner, an inventory of network elements may be maintained in the database so that network elements are catalogued. As such, the user interface presented to the circuit designer for designing the circuit may include information that is filtered based on the database-level constraints. For example, a listing of the network elements may be presented as a drop-down menu list with no free-form text input for these fields. As would be appreciated, the inventory of network elements may be updated to add, remove, and/or update network elements.

In some implementations of the invention, circuit design manager 112 may receive a request for availability reports, for example, parent circuit reports, child circuit reports, equipment reports, and/or other reports. Circuit design manager 112 may generate these reports which may include information regarding the network elements that have been selected for the designed circuits.

Figure 2:
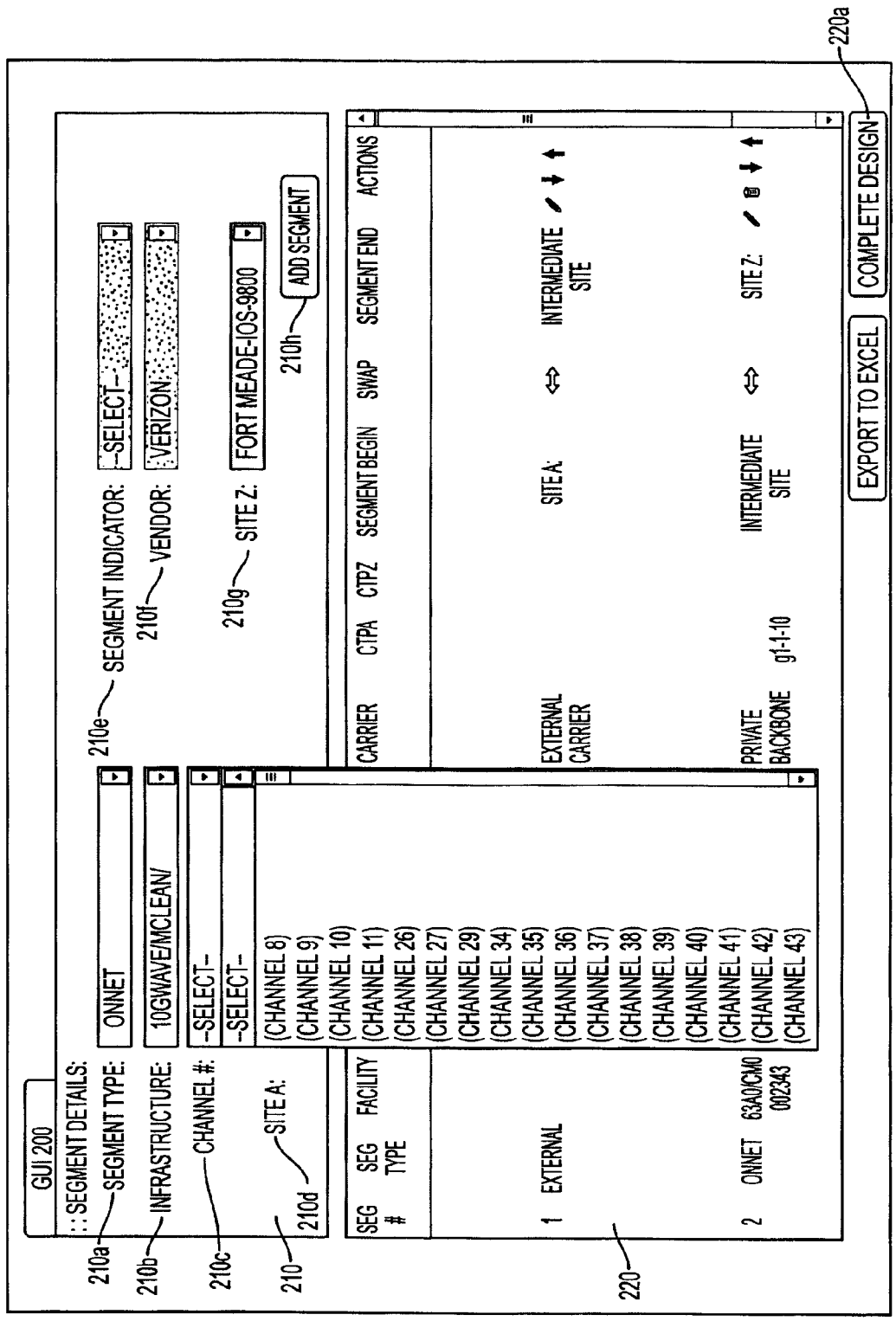
FIG. 2 illustrates an exemplary GUI screen for designing a circuit by selection of one or more channels, according to various aspects of the invention.

FIG. 2 depicts an exemplary GUI screen 200 generated and/or presented by circuit design manager 112 for designing of a circuit between a first endpoint (illustrated in FIG. 2 as "Site A") and a second endpoint (illustrated in FIG. 2 as "Site Z") by selection of one or more channels. The GUI screen illustrated in FIG. 2 and other drawing figures are non-limiting examples for illustrative purposes only. For example, various objects illustrated in this and other GUI drawing figures may be added, deleted, resized, reshaped, reconfigured, and/or otherwise altered, as would be appreciated.

In some implementations of the invention, the one or more channels may be tracked via the capacity information described herein. In some implementations of the invention, GUI 200 may include at least two sections, section 210 and section 220. Section 210 may include one or more fields from which a circuit designer may specify/select for each segment. In some implementations of the invention, segment type field 210a may define the type of segment, for example, external segment associated with external carrier/provider, private (also referred to as "OnNet") segment associated with the private backbone network. In some implementations of the invention, the circuit designer may select the type of segment from the segment type field 210a. Infrastructure field 210b may define carrier/backbone servers/equipment being used.

In some implementations of the invention, channel number field 210c may provide a list of available channels that a circuit designer may select to design to the circuit. The list of available channels may change based on the segment type/infrastructure selected. For example, the list of channels may be different for an external segment (i.e., network elements from one or more outside or third party vendors) versus a private segment (i.e., network elements from the private backbone network). In some implementations of the invention, unavailable channels may not be presented to the circuit designer.

In some implementations of the invention, different channels may have different speeds. A default channelization (i.e., segmentation) for each speed may be utilized (for example, an OC12 channel may be channelized into 12 STS1 channels or combinations of STS1 and OC3. In some implementations, a designed circuit may utilize one channel. A different designed circuit may utilize different speeds associated with different channels. As such, one or more circuits designed to the facility may not be required to have the same speed. In some implementations of the invention, the capacity information may include the different speed for each channel, thereby enhancing an ability to generate an appropriate circuit based on the customer request.

In some implementations of the invention, the site A field 210d and site Z field 210g may define the first and second endpoints, respectively, between which the network connection/circuit needs to be established (for example, based on the customer request). The site A field 210d and site Z field 210g may, for example, provide a list of names associated with a number of sites to choose from. Segment indicator field 210e may define some capabilities of the segment. For example, an OnNet segment may identify a segment built completely on the Core180 platform/facilities, requiring no additional vendor orders for that segment. In some implementations, a carrier segment may indicate a segment routed entirely on an external vendor's facility (i.e., external network carrier's/provider's network), which may be designed using functions described herein. In some implementations, a hub segment may indicate a segment routed over a prepaid facility provided by an external vendor, but utilizing only specific channels on the external vendor facility (i.e., not the full capacity). Vendor field 210f may define a list of vendors (for example, in the form of vendor names) from which to choose. In some implementations of the invention, when the segment type is external, the vendor field may indicate a name of the vendor from which the external segment originates.

As illustrated in FIG. 2, the segment indicator and vendor fields have been disabled because the segment type selected is "OnNet" or "private". Once the circuit designer has made the appropriate selections for a segment via the one or more fields, the "add segment" button 210h may be executable by circuit designer.

Section 220 may provide a summarized view for each segment. In response to the "add segment" button execution, circuit design manager 112 may summarize the selected properties associated with the segment based on the selections made via one or more fields in section 210 and may add the segment in section 220. In some implementations of the invention, circuit design manager 112 may provide or otherwise cause to be executed a query including one or more of the selected properties to database manager 114. Database manager 114 may query the database 130 to retrieve additional information associated with the selected segment, for example, channel termination point information for sites A, Z, (where channel termination points represent the end points of a channel within the facility) and/or any other intermediate sites, segment begin site information identifying the beginning site for a segment, segment end site information identifying the ending site for a segment, actions that may be performed (e.g., attach to email, upload, download, export, delete, etc.), and/or other information associated with the selected segment. In other words, database 130 may store this additional information associated with one or more segments that may be selected for circuit design. Database manager 114 may provide the additional information to circuit design manager 112. Circuit design manager 112 may gather the information associated with the selected properties in section 210 with the additional information received from database manager 114 to provide the summarized view for each segment.

As illustrated in FIG. 2, section 220 may provide, among other information, for each segment, segment type information, facility/circuit identifier information, carrier information (e.g., external carrier vs. private backbone network, carrier name, etc.), channel termination point (CTP) information, segment begin site and end site information, action information, and/or other information.

In some implementations of the invention, once all the segments for a circuit have been selected, the complete design button 220a may be executed by circuit designer. Once the complete design button has been executed, a circuit layout diagram may be generated. An exemplary circuit layout diagram is depicted in FIG. 4.

Figure 3:
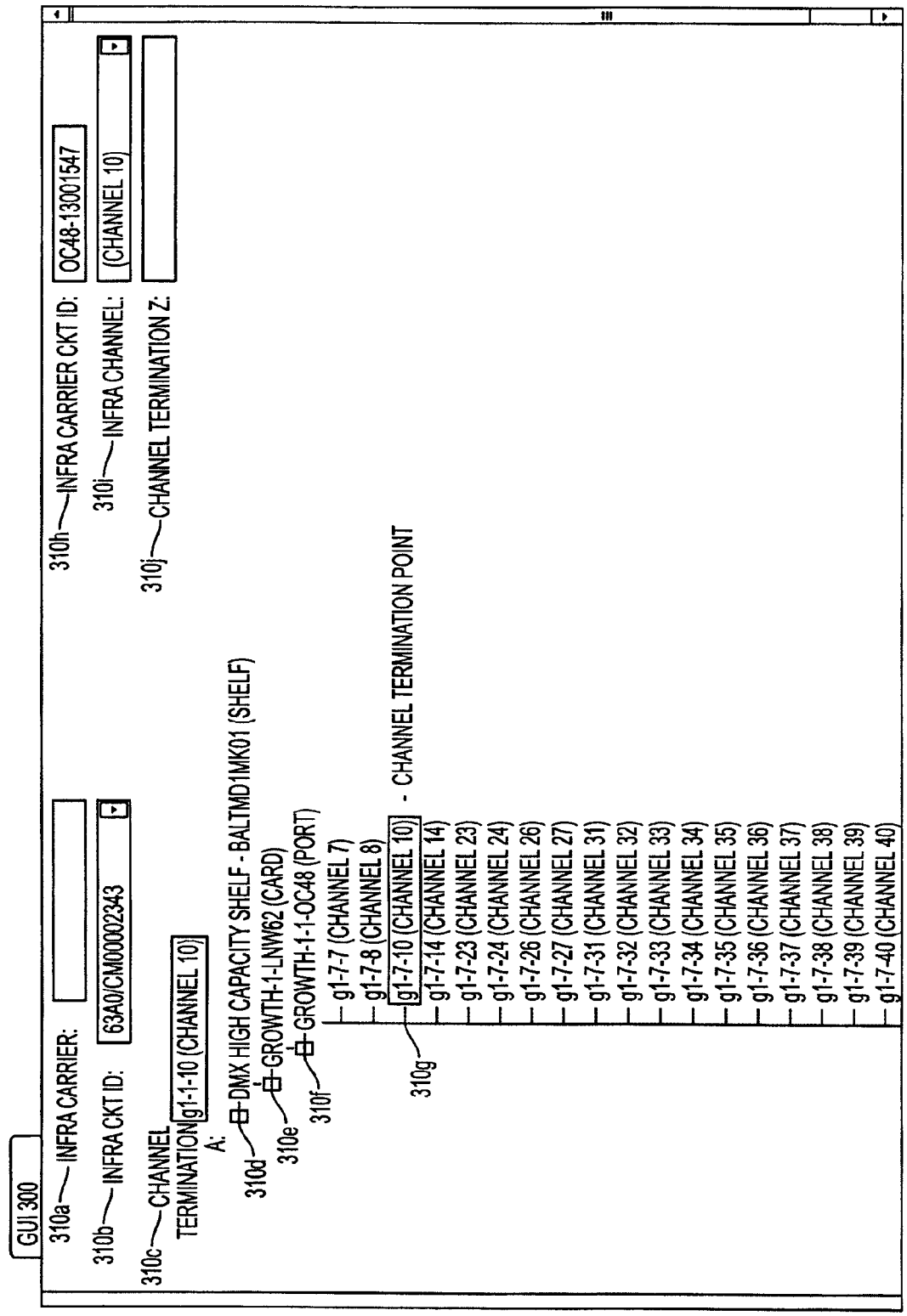
FIG. 3 illustrates an exemplary GUI screen for designing a circuit by selection of one or more equipment, according to various aspects of the invention.

FIG. 3 depicts an exemplary GUI screen 300 generated and/or presented by circuit design manager 112 for specification of one or more network elements when designing a circuit coupling Site A and Site Z. GUI 300 may include one or more fields from which a circuit designer may specify/select. The circuit designer may select a shelf, card, port, and/or channel termination point for designing the circuit. Infra Carrier field 310a may define the name of the carrier. Infra Ckt ID field 310b may provide a circuit identifier for the circuit associated with the carrier. The circuit identifier may be an automatically generated unique name for the circuit. In some implementations, the circuit designer may select the circuit to be used based on the Ckt ID field, which may be further filtered by selection of Site A, Site Z, channel speed, and/or parameters. Channel Termination A field 310c may define the channel termination point at Site A. Fields 310d, 310e, 310f, 310g may indicate selection for shelf, card, port, and channel termination point for Site A. Only available shelf, card, port, and channel termination point information may be provided to circuit designer for selection purposes. Infra Carrier Ckt ID field 310h may specify—the carrier's own name for a circuit provided by the carrier. Infra Channel field 310i may specify a list of channels from which the circuit designer may select an appropriate channel, which may be defined by a channel with the appropriate speed for that circuit design.

Figure 4:
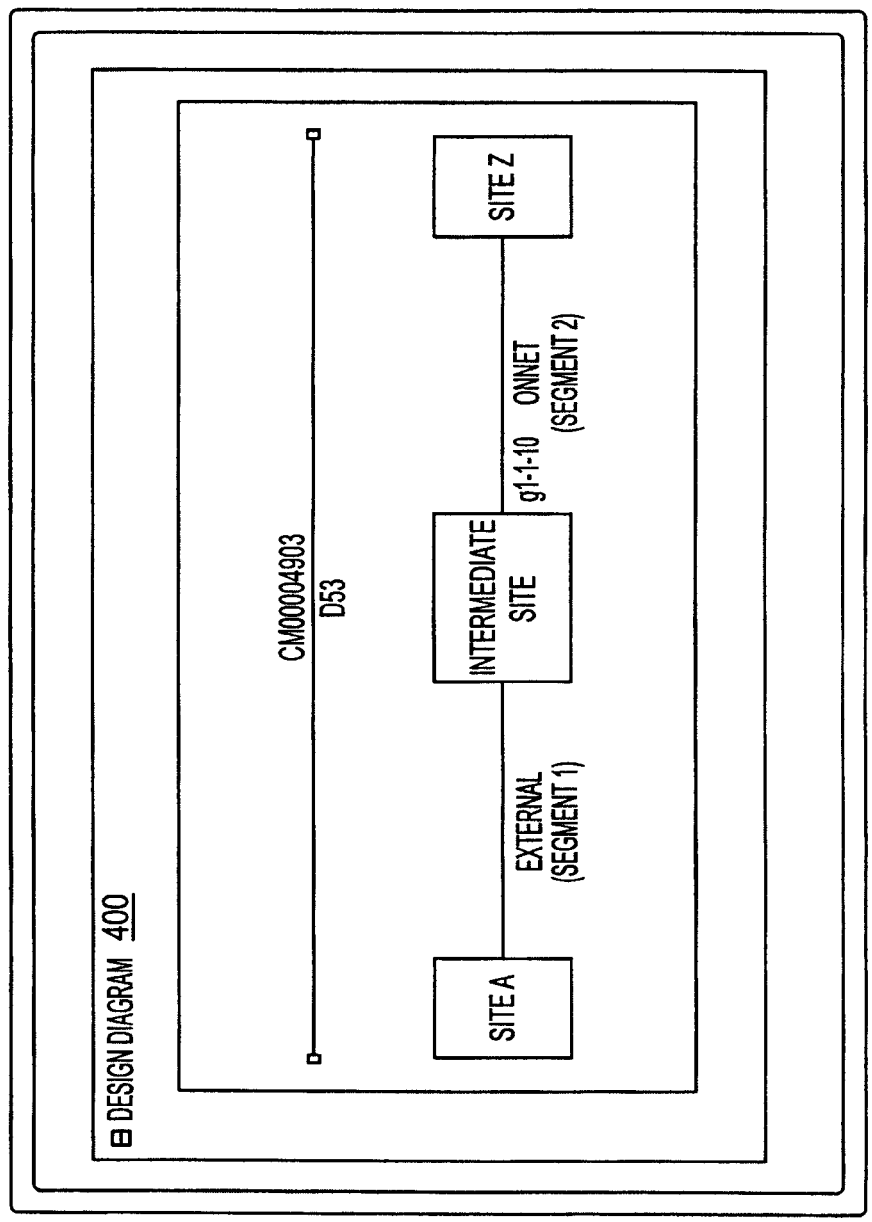
FIG. 4 illustrates an exemplary circuit layout diagram, according to various aspects of the invention.

FIG. 4 illustrates an exemplary circuit layout diagram 400, according to various aspects of the invention. Circuit layout diagram 400 illustrates a circuit that couples a first endpoint ("Site A") with a second endpoint ("Site Z"). The circuit couples Site A and Site Z via a first segment (illustrated in FIG. 4 as "External (Segment 1)") and a second segment (illustrated in FIG. 5 as "ONNET Segment 2"). Segment 1 couples Site A with an "Intermediate Site" and Segment 2 couples the Intermediate Site with Site Z. Thus, the circuit illustrated by circuit layout diagram 400 includes Segment 1, Segment 2, and the Intermediate Site. Segment 1 illustrates an external segment. In other words, the external segment may be provided for by a third party vendor of network services/infrastructure. Segment 2 illustrates an internal segment part of the private backbone network, for example. Thus, circuit layout diagram 400 illustrates a circuit using network elements from both an external network provider and a private network backbone described herein. As would be appreciated, circuit layout diagram 400 is exemplary only; any number and type (external or private) of segments may be used to couple Site A (or other site) with Site Z (or other site).

Figure 5:
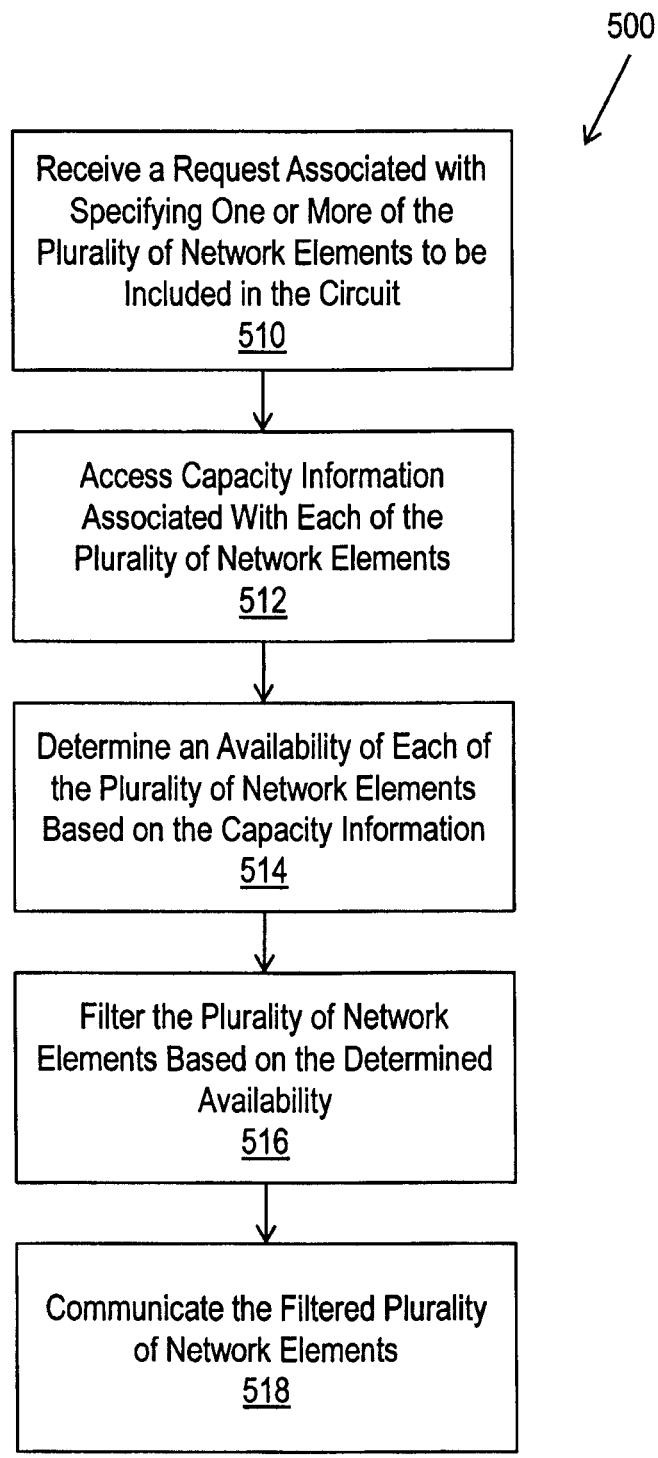
FIG. 5 illustrates a flowchart depicting example operations performed by a network management system, according to various aspects of the invention.

FIG. 5 is a flowchart 500 depicting example operations performed by a network management system 100, according to various aspects of the invention. In some implementations of the invention, the example operations may be performed by one or more components/modules of the network management system 100. In some implementations of the invention, various operations may be performed in different sequences. In other implementations, additional operations may be performed along with some or all of the operations shown in FIG. 5. In yet other implementations, one or more operations may be performed simultaneously. In yet other implementations, one or more operations may not be performed. Accordingly, the operations described are exemplary in nature and, as such, should not be viewed as limiting.

In operation 510, a request associated with designing a circuit may be received, by circuit design manager 112, for example. In operation 512, capacity information associated with each of a plurality of network elements may be accessed, by circuit design manager 112, for example. In some implementations, circuit design manager 112 may access capacity information in response to the customer request. In some implementations of the invention, circuit design manager 112 may access the capacity information by communicating with database manager 114. For example, circuit design manager 112 may query or otherwise interrogate database 130 via database manager 114, which may communicate with database 130 to retrieve the capacity information. Database manager 114 may provide the retrieved capacity information to circuit design manager 112.

In operation 514, an availability of each network element based on the capacity information may be determined, by circuit design manager 112, for example. In other words, because the capacity information may include whether or not a network element is available, circuit design manager 112 may determine whether a particular network element is available for use in a circuit.

In operation 516, the plurality of network elements may be filtered based on the determined availability of each of the network elements, by circuit design manager 112, for example. In other words, circuit design manager 112 may allow only the available network elements to be selectable for inclusion in the circuit and may not allow unavailable network elements to be selectable. In operation 518, the filtered network elements may be communicated for selection, by circuit design manager 112, for example.

In some implementations of the invention, circuit design manager 112 may filter the network elements by omitting the network elements that are unavailable from the network elements. In other words, circuit design manager 112 may communicate only network elements that are available while omitting network elements that are unavailable so that they may not be selected by the circuit designer. In some implementations of the invention, circuit design manager 112 may filter the plurality of network elements by providing indicia for the unavailable ones of the plurality of network elements, wherein the indicia indicates the unavailable ones of the plurality of network elements are not selectable. In these implementations, circuit design manager 112 may communicate the unavailable ones of the plurality of network elements and the indicia. For example, when presented via a GUI, the unavailable ones of the plurality of network elements may be presented to the circuit designer with indicia (such as being "grayed out" or other indicia) that indicates the network elements are not selectable.

As would be appreciated, circuit design manager 112 may access the capacity information, determine the availability, and/or filter the network elements based on an interaction with database 130. For example, the interaction may include a database query that accesses the capacity information, determines which network elements are available, and filters network elements based on the capacity information stored by database 130.

In some implementations of the invention, circuit design manager 112 may communicate the filtered plurality of network elements for selection. For example, the filtered plurality of network elements may be communicated to a circuit designer for selection by the circuit designer. In one implementation, circuit design manager 112 may communicate the retrieved information via a GUI presented to the circuit designer. The GUI may present the one or more the available network elements (i.e., the filtered plurality of network elements) for selection by the circuit designer.

In some implementations of the invention, network elements may be associated with one another such that selection of one network element of a first segment will automatically (e.g., by circuit design manager 112) cause selection of a second segment. For example, some customer trunks have been split into two separate facilities. Whenever one of those customer trunks is used in the design of a circuit, the other customer trunk may also be required. As such, when a channel from one of these customer trunks is added as a segment to a circuit, a second segment that uses a channel from the other customer trunk may be automatically be added to the circuit design. In this manner, when a first network element is associated with a second network element, selection of the first network element causes automatic selection of the second network element and vice versa.

In some implementations of the invention, a facility may be designed using Open Channelization, where the designed circuit may itself identify the requirement for channelization. Open channelization, as opposed to fixed channelization, does not require predefinition of the channel structure of a facility. With open channelization, channel speed may be determined and set at design time. This is unlike fixed channelization where the designer may select a predefined channel with an appropriate speed. For example, if a designer is designing a DS3 circuit using fixed channelization, the designer may select a predefined STS1 channel in an OCx facility. However, with open channelization, the channel structure of the OCx facility may not be predetermined and the designer may create an STS1 channel at design time, thereby saving a design step.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method for capacity management of at least one computer network having a plurality of network elements that include at least one of a channel, port, card, panel and a channel termination point, the method being executed by at least one processor configured to perform a plurality of operations, the method comprising:

receiving a request, via a user interface, to form a circuit that couples a first endpoint and a second endpoint at different locations within the at least one computer network;

accessing a database for capacity information associated with each of the plurality of network elements;

determining an availability of each of the plurality of network elements based on the capacity information;

filtering the plurality of network elements based on the determined availability, and providing indicia for the unavailable ones of the plurality of network elements, wherein the indicia indicates that the unavailable ones of the plurality of network elements are not selectable for inclusion in the circuit;

communicating the filtered plurality of network elements, including the unavailable ones of the plurality of network elements and the indicia, via the user interface for specifying selectable network elements of the plurality of network elements for the circuit;

receiving a first indication at the user interface that a first network element is unavailable;

updating the capacity information to indicate that the first network element is unavailable for selection based on the first indication;

receiving a second indication, subsequent to the first indication, that the first network element is available; and updating the capacity information to indicate that the first network element is available for selection based on the second indication.

2. The computer-implemented method of claim 1, wherein the indication indicates that the first network element has been selected for use in the circuit, thereby causing the first network element to be unavailable.

3. The computer-implemented method of claim 1, wherein the plurality of network elements form part of an interconnect point that couples a backbone network of a first network provider with at least one other network of a second network provider different from the first network provider.

4. A non-transitory tangible computer-readable storage medium having computer-readable instructions thereon for capacity management of at least one computer network including a plurality of network elements that include at least one of a channel, port, card, panel and a channel termination point, the instructions being executed by at least one processor to:

receive a request, via a user interface, to form a circuit that couples a first endpoint and a second endpoint at different locations within the at least one computer network;

access a database for capacity information associated with each of the plurality of network elements;

determine an availability of each of the plurality of network elements based on the capacity information;

filter the plurality of network elements based on the determined availability, and provide indicia for the unavailable ones of the plurality of network elements, wherein the indicia indicates that the unavailable ones of the plurality of network elements are not selectable for inclusion in the circuit;

communicate the filtered plurality of network elements, including the unavailable ones of the plurality of network elements and the indicia, via the user interface for specifying selectable network elements of the plurality of network elements for the circuit;

receive a first indication at the user interface that a first network element is unavailable;

update the capacity information to indicate that the first network element is unavailable for selection based on the first indication;

receive a second indication, subsequent to the first indication, that the first network element is available; and update the capacity information to indicate that the first network element is available for selection based on the second indication.

5. A computer-implemented system for capacity management of at least one computer network including a plurality of network elements that include at least one of a channel, port, card, panel and a channel termination point, the system comprising:

at least one processor configured to receive a request, via a user interface, to form a circuit that couples a first endpoint and a second endpoint at different locations within the at least one computer network, access a database for capacity information associated with each of the plurality of network elements, determine an availability of each of the plurality of network elements based on the capacity information, filter the plurality of network elements based on the determined availability, and provide indicia for the unavailable ones of the plurality of network elements, wherein the indicia indicates that the unavailable ones of the plurality of network elements are not selectable for inclusion in the circuit, and communicate the filtered plurality of network elements, including the unavailable ones of the plurality of network elements and the indicia, via the user interface for specifying selectable network elements of the plurality of network elements for the circuit, receive a first indication at the user interface that a first network element is unavailable, update the capacity information to indicate that the first network element is unavailable for selection based on the first indication, receive a second indication, subsequent to the first indication, that the first network element is available, and update the capacity information to indicate that the first network element is available for selection based on the second indication.

\* \* \* \* \*